US006435053B1

(12) United States Patent
Guiet et al.

(10) Patent No.: US 6,435,053 B1
(45) Date of Patent: Aug. 20, 2002

(54) ACTUATING ARRANGEMENT WITH INTERLOCK TO PREVENT UNINTENDED ACTUATION WHEN IN A NON-OPERATING POSITION

(75) Inventors: Lionel Guiet, Gray; Daniel-Pierre Bignon, Villejuif, both of (FR)

(73) Assignee: Deere & Company, Moline, IL (US)

( * ) Notice: Subject to any disclaimer, the term of this patent is extended or adjusted under 35 U.S.C. 154(b) by 20 days.

(21) Appl. No.: 09/606,890

(22) Filed: Jun. 29, 2000

(30) Foreign Application Priority Data

Jul. 10, 1999 (DE) ........................................ 199 32 286

(51) Int. Cl.[7] .......................... B60K 20/00; G05G 5/08

(52) U.S. Cl. ....................... 74/473.26; 180/271; 74/493

(58) Field of Search ......................... 74/473.26, 473.25, 74/473.21, 486 R, 469; 192/3.63, 220.3; 180/268, 271, 286

(56) References Cited

U.S. PATENT DOCUMENTS

| | | | | |
|---|---|---|---|---|
| 4,222,287 A | | 9/1980 | Drone et al. | 74/529 |
| 4,355,819 A | * | 10/1982 | Frisbee | 280/752 |
| 4,366,881 A | * | 1/1983 | Frisbee | 180/271 |
| 4,429,761 A | * | 2/1984 | Haddock, Jr. et al. | 180/271 |
| 4,489,805 A | | 12/1984 | Okabe | 180/271 |
| 4,526,055 A | | 7/1985 | Batchelor et al. | 74/471 XY |
| 5,325,733 A | | 7/1994 | Papasideris et al. | 74/483 R |
| 6,148,688 A | * | 11/2000 | Nishimaki | 74/493 |

FOREIGN PATENT DOCUMENTS

| | | |
|---|---|---|
| GB | 1 474 862 | 5/1977 |
| GB | 2328268 | 2/1999 |

OTHER PUBLICATIONS

English abstract of Japanese Publication 61040929 dated Feb. 27, 1986, 4 pages, title—Operator For Oil–Pressure Shovel.

English abstract of Japanese Publication 63194037 dated Aug. 11, 1988, 6 pages, title—Operating Apparatus For Construction.

English abstract of Japanese Publication 02183818, 3 pages, title—Safety Device For Control Lever.

Baas Trima Frontlader Advertising Brochure, 15 pages, date of publication—unknown, Published in Germany.

* cited by examiner

*Primary Examiner*—David A. Bucci
*Assistant Examiner*—Justin Stefanon

(57) ABSTRACT

An actuating arrangement (14) for a front end loader or the like is provided with a locking bar (52), an adjustable carrier (46) and an interlock (44). The interlock (44) is activated upon movement of the carrier (46) out of an operating position and prevents the locking bar (52) from being brought into a position in which the actuating members (40) can be activated. The interlock prevents unintended activation of the loader when the carrier (46) is in the non-operating position and prevents the carrier from being moved from the operating position unless the actuators (40) are blocked from movement.

4 Claims, 5 Drawing Sheets

ACTUATING ARRANGEMENT WITH INTERLOCK TO PREVENT UNINTENDED ACTUATION WHEN IN A NON-OPERATING POSITION

BACKGROUND AND SUMMARY OF THE INVENTION

The present invention relates to an actuating arrangement with at least one actuating member mounted in a carrier that is movable between operating and non-operating positions and in particular to an interlock to prevent unintended actuation when the carrier is in the non-operating position.

GB 1 474 862 discloses an actuating arrangement for a front end loader of an agricultural tractor. The actuating arrangement contains a handgrip that is connected by a cable to the tool of the front end loader. The actuating arrangement is arranged on the upper end of a vertically pivoted mount, that can be brought into an operating position and a non-operating position.

The prospectus BAAS TRIMA front loader, printer's notation B&T 5.000 shows on its page 5 a lifting control for a front loader, that is provided with a safety control circuit. This safety control circuit can be activated by means of a small lever and blocks the control.

The problem underlying the invention is seen in the fact that the actuating arrangement is not sufficiently protected against an inadvertent operation, in particular in the non-operating position of the carrier or mount, and that a vehicle with a lifting and loading arrangement can bring about a dangerous situation upon an unintended actuation.

The problem is solved according to the invention by the provision of an interlock that prevents movement of the carrier to the non-operating position as long as it is still possible to activate the actuating members. An activation can be performed, for example, by mechanically depressing a component, but also by a contacting or non-contacting switching process. Accordingly, on the one hand, on the basis of the position of the carrier, it is visibly obvious whether an actuation is possible or not, and an unintended movement of the carrier into a position in which the actuating arrangement cannot be controlled visually or can be operated improperly is prevented. A position in which an activation of the actuating arrangement should not be possible may be a non-operating position as well as any position of the carrier outside of the operating position which can create more freedom of movement for an operator, free space for a pivoted operator's seat, space for other components or the like, or space for ingress and egress.

A simple and reliable means of preventing the movement of the carrier or an activation of the actuating arrangement, is seen in the application of a mechanical locking bar that can be brought into engagement with the actuating member or members or the interlock. The selective engagement possibility gives the assurance that either the repositioning of the carrier or of the interlock is possible—but in no case that of both.

The locking bar can also be operated electrically by means of an electromagnet or the like, and is then in a position to block the interlock or the actuating arrangement, when each of the other components can be moved or actuated.

The interlock can be configured mechanically and therefore very robustly. On the other hand an electrical interlock makes sense where space conditions do not permit a simple guide arrangement of a mechanical linkage or an interconnection with further signals is to be provided.

A mechanical interlock can be provided simply and cost effectively by means of a rod or a tensioning device, for example, a cable. The corresponding position of the interlock that should result from a relative change in the position of the carrier with respect to a stationary bearing is brought about by the eccentric location of the mechanical interlock with respect to the pivot axis of the carrier. The location of the interlock can be varied by variation in the degree of eccentricity.

The use of an actuating member that can be varied in length or moved linearly with corresponding recesses makes possible a simple engagement or disengagement of the locking arrangement or the locking bar, and thereby performs an interlock or disengages it. Here positive locking is attained simply by movement of the locking bar transverse to the actuating member.

The application of such an advantageous actuating arrangement provides great utility for a vehicle equipped with a lifting or loading arrangement, since such arrangements in a vehicle can present a danger with inexpert handling. These vehicles can be agricultural or forest products vehicles, but also vehicles in the construction trades. Therefore the tensioning or loading arrangement can include three-point hydraulic devices, loader shovels, front hydraulic devices, grippers and the like.

The actuating arrangement is particularly advantageous on an agricultural tractor with a front end loader, since the latter is used only briefly, but remains attached to the agricultural tractor in the non-operating condition.

BRIEF DESCRIPTION OF THE DRAWINGS

The drawing shows an embodiment of the invention that shall be described in greater detail in the following.

DETAILED DESCRIPTION OF THE PREFERRED EMBODIMENT

Figure 1:
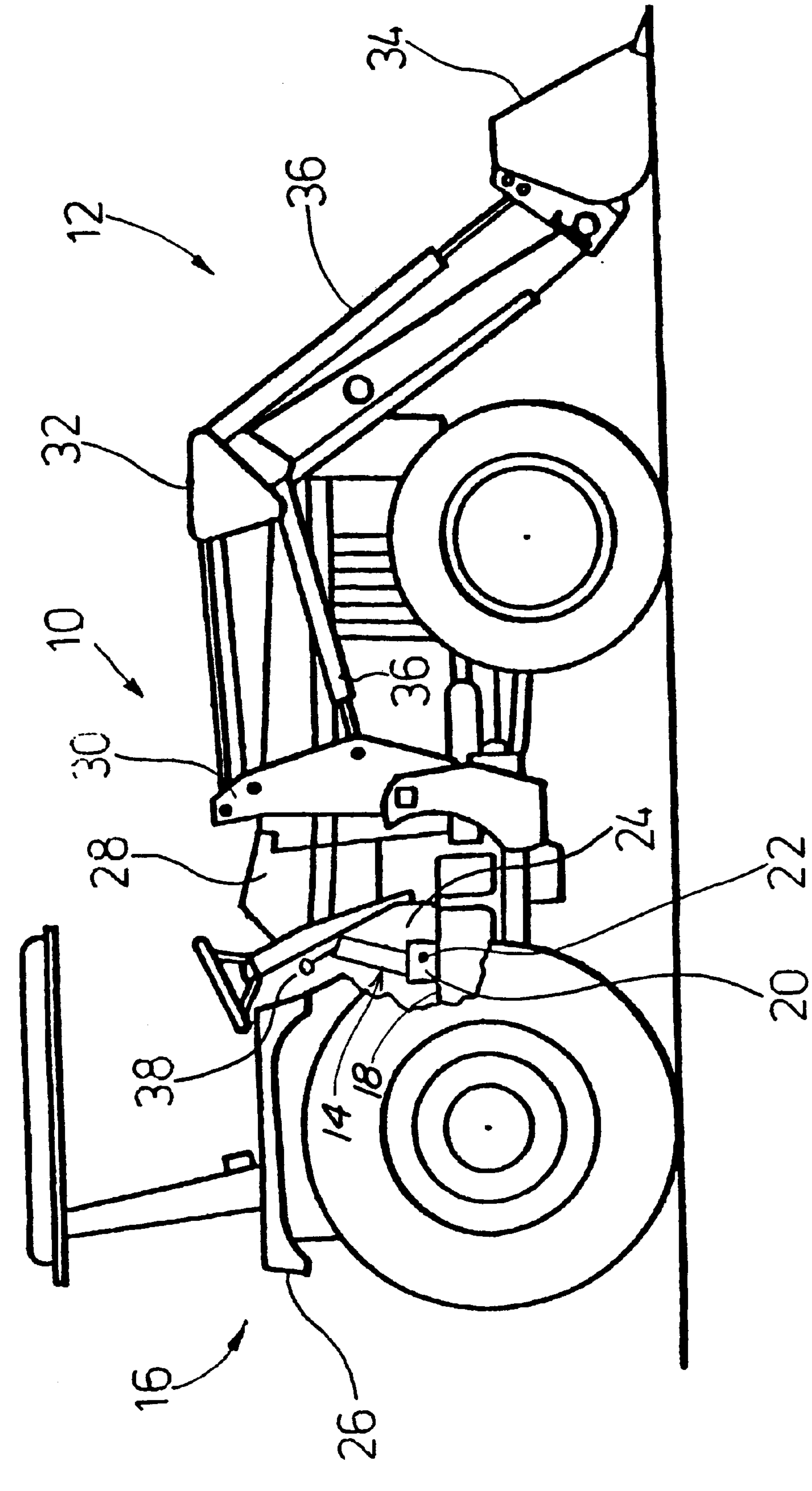
FIG. 1 shows an agricultural tractor with a front end loader and an actuating arrangement with a carrier.

FIG. 1 shows an agricultural tractor 10 with a front end loader 12 and an actuating arrangement 14. The agricultural tractor 10 is equipped with an operator's platform 16 from which, among other items, the operation of the front end loader 12 can be controlled. Among other items, the operator's platform 16 contains a bottom 18 with a bearing 20 and a pivot axis 22. A passage 24 makes it possible for the operator to leave the operator's platform 16 between a fender 26 and an instrument panel 28.

Among other items, the front end loader 12 includes a retaining mount 30, a follower 32, a tool 34 and several hydraulic cylinders 36.

The retaining mount 30 provides a vertically pivoted connection of the follower 32 to the agricultural tractor 10.

The follower 32 can be brought into as many positions as desirable with respect to an initial surface, for which a first set of hydraulic cylinders 36 are extended or retracted.

As an example, the tool 34 is shown as a shovel. Actually there are a multitude of different tools 34, as is adequately known, and that could equally well be employed. The position of the tool 34 with respect to the follower 32 is determined by means of another set of hydraulic cylinders 36.

The hydraulic cylinders 36 are supplied from the hydraulic system of the agricultural tractor 10 by means not shown and are controlled by means of the actuating arrangement 14.

Figure 2:
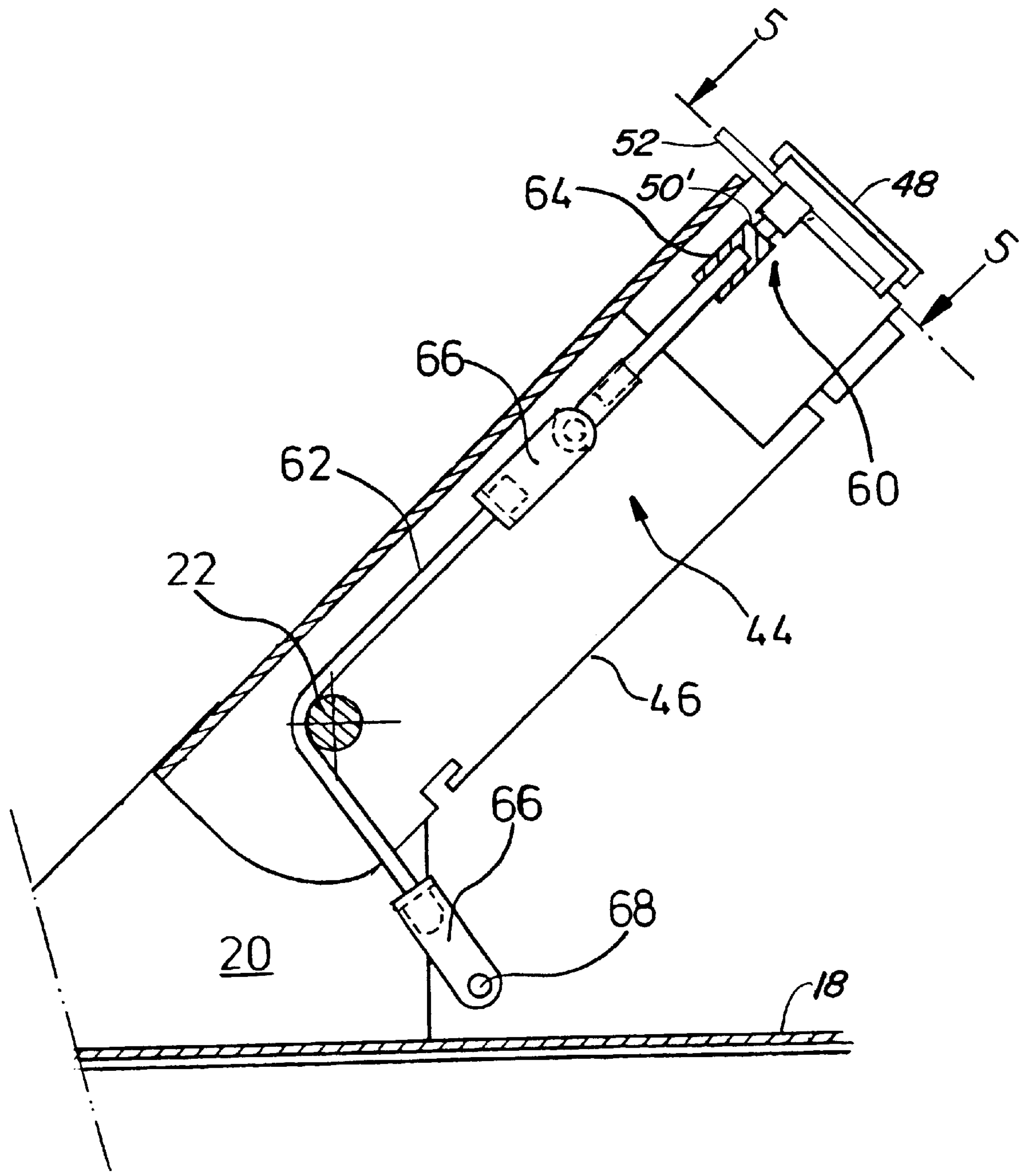
FIG. 2 shows an enlarged view of the actuating arrangement with an interlock with the carrier in a non-operating position.
Figure 3:
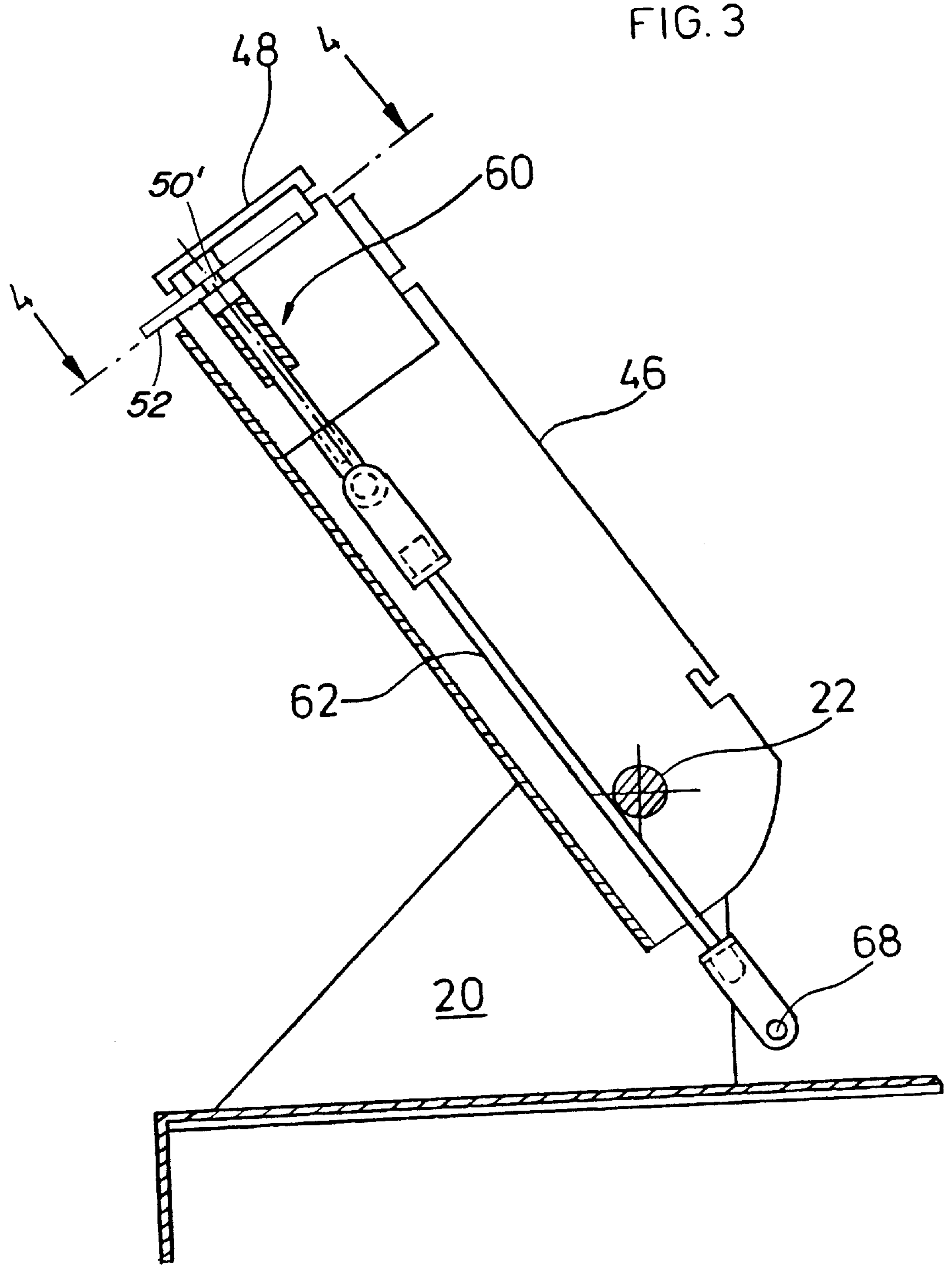
FIG. 3 shows an enlarged view of the actuating arrangement with the interlock with the carrier in an operating position.

A first embodiment of the actuating arrangement 14 is shown in greater detail in FIGS. 2 through 5. The actuating arrangement 14 includes a shift lever 38 (FIG. 1), at least one actuating member 40, a locking arrangement 42, an interlock 44 and a carrier 46. The carrier 46 rotates about the pivot axis 22 between operating and non-operating positions as illustrated in FIGS. 3 and 2 respectively.

The shift lever 38 can occupy various positions in which, in each case, valves, not shown, are actuated via the one or more actuating members 40 for positioning of the hydraulic cylinders 36. The shift lever 38 may preferably be supported in bearings and gimbaled, so that it can occupy forward and backward as well as sideways shift positions.

Figure 5:
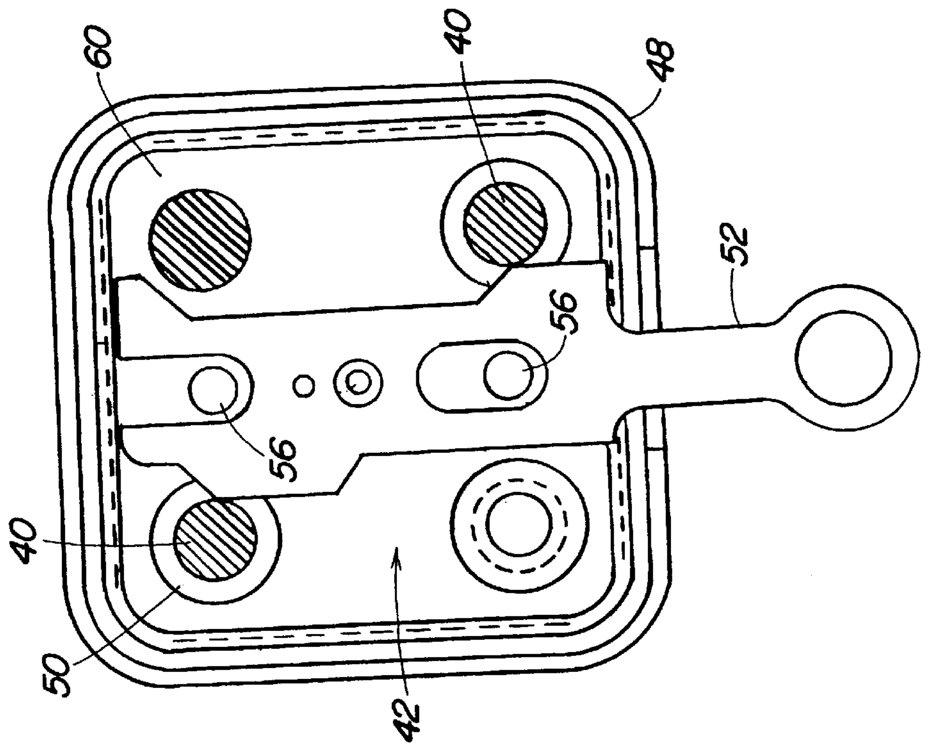
FIG. 5 shows the actuating arrangement in a view of the plane 5—5 in the direction of the associated arrows in the non-operating position.
Figure 4:
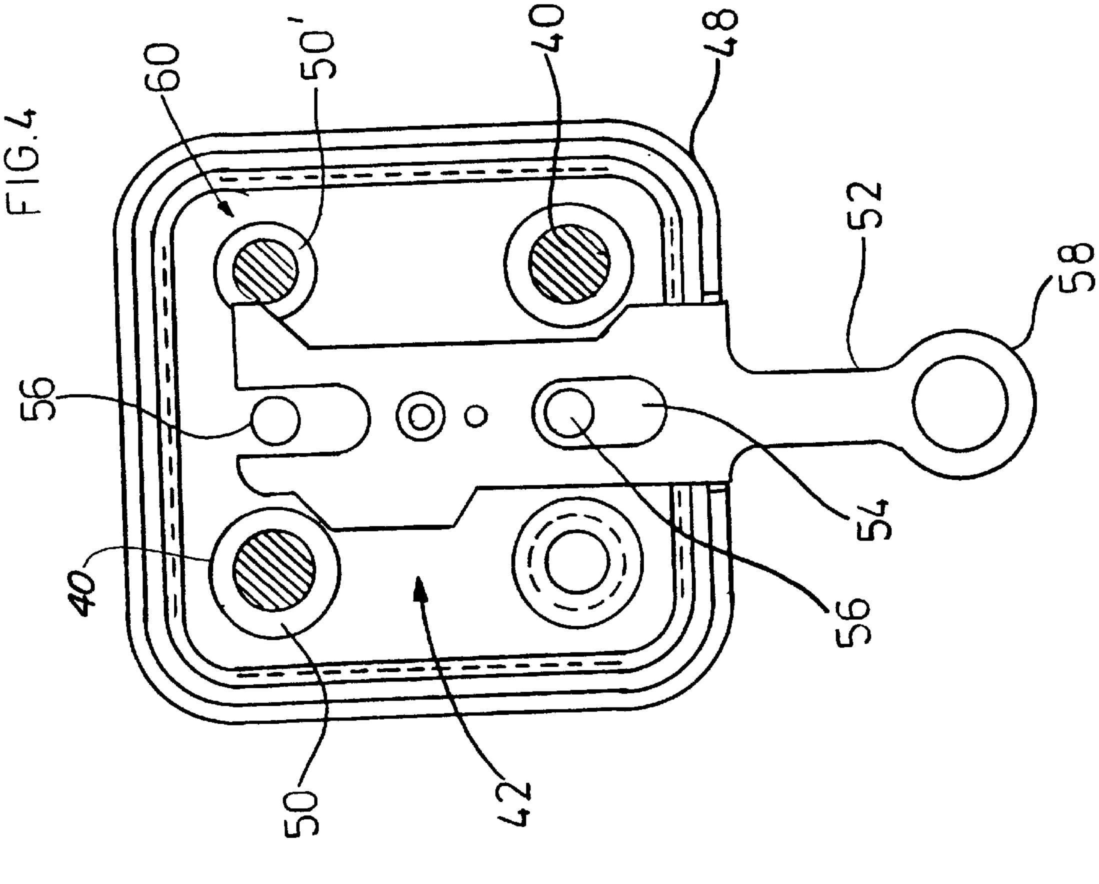
FIG. 4 shows the actuating arrangement in a view of the plane along the lines 4—4 in the direction of the associated arrows in the operating position.

Each actuating member 40 transmits the movement originated by the shift lever 38 to the valve—either mechanically, for example, by means of a push-pull cable, or electrically by means of wires or by wireless actuation. For the sake of simplicity, each actuating member 40 is shown as an axially movable slide that can project to a greater or lesser degree beyond the base plate of a housing 48. Alternatively the actuating member could also be configured as a switch. The remaining part of the housing 48 with the bearing support of the shift lever 38 is not shown. The circumferential surface of each actuating member 40 is provided with a recess 50 in the form of a ring groove. Although the FIGS. 4 and 5 show two actuating members 40; there may be more or fewer.

The locking arrangement 42 is used to prevent the activation of the actuating members 40 in at least one particular situation, for example, at that time at which the carrier 46 is not in its operating position. According to another view, the carrier 46 should permit pivoting from the operating position only when the actuating members 40 are locked. In this way, for example, a lowering of the follower 32 can be prevented if a person is located underneath it. The locking arrangement 42 includes a locking bar 52, that is configured as a metal plate and is supported by bearings in the housing 48, free to slide. The locking bar 52 can be brought into positive locking with the recesses 50 and forms the locking arrangement 42 with these components; in this case the actuating members 40 are blocked (FIG. 5).

The shape of the locking bar 52 is selected in such a way that it engages in the recesses 50 of the actuating members 40 or in a recess 50' of the interlock 44. For this purpose, correspondingly dimensioned projections are provided on the locking bar 52. Two slots 54 and two pins 56 are provided for its guidance. On its end region projecting beyond the housing 48, the locking bar 52 contains a handgrip 58. In case of a switch, in particular a non-contacting switch, this is covered flush by means of projections configured as plates, and thereby can no longer be operated.

In the first embodiment, the interlock 44 contains a slide 60 and a tensioning device 62. There are two reasons for the interlock 44—on the one hand it is to prevent the carrier 46 from being pivoted into a non-operating position, as long as the actuating members 40 can be activated; on the other hand, it should block the actuating members 40 directly or indirectly when the carrier 46 is outside of its operating position.

Similar to the actuating members 40, the slide 60 is supported in bearings, free to slide in the longitudinal direction, in the housing 48 and is constantly preloaded by means of a spring 64 in such a way that when the carrier 46 is in the operating position, the slide 60 moves into the plane of motion of the locking bar 52 (FIG. 3) to such a degree that the locking bar 52 can enter the recess 50'. The locking bar 52 is configured such that when the locking bar 52 is in the recess 50', the locking bar is not in the recesses 50 of the actuators 40. Thereby the actuating members 40 are free to be activated. If, on the other hand, the spring 64 is stretched completely, then the recess 50' of the slide 60 is outside, that is, underneath the plane of motion of the locking bar 52, (see FIG. 2) then the locking bar 52 engages the recesses 50 of the actuating members 40 and blocks the actuating members from movement.

In this embodiment, the tensioning device 62 is configured as a cable that is provided at each end with a fork-shaped connecting device 66. By means of the upper connecting device 66 the tensioning device 62 is connected to the slide 60, and by means of the lower connecting device 66 the tensioning device 62 is connected to the bearing 20. The connection is free to pivot in each case and, at least on one side, free to change in length. Between the two connecting devices 66 the tensioning device 62 is routed around the pivot axis 22. The connection of the lower connecting device 66 to the bearing 20 is eccentric to the pivot axis 22, in particular at a bearing location 68 so that in the one end position of the tensioning device 62 it extends at least generally straight, while in another end position of the tensioning device 62 it is bent and extends over a two-legged course, where the legs meet at the pivot axis 22. The resulting bend has the effect of moving the slide 60, at a constant length of the tensioning device 62, when the carrier 46 is pivoted.

The following refers to the configuration shown in FIGS. 4 and 5.

Both illustrations of a plan view in the direction of the base plate of the housing 48 show an actuating member 40 in each of the left upper and the right lower corner region, where in each case the recess 50 is visible due to the location of the cutting plane. The slide 60 is located in the right upper corner region. In the left lower corner region the possibility of a further actuating member 40 is indicated. The locking bar 52, the slots 54 and the pins 56 extend generally symmetrical about a central axis. The locking bar 52 extends in the lower end region of the drawing with the handgrip 58 beyond the housing 48 and is movable in the longitudinal direction, where the lower closed slot 54 with the pin 56 enclosed therein determines the limit of the freedom of motion of the locking bar 52. The projections arranged at the sides of the locking bar 52 are configured and arranged in such a way that in a non-operating position, FIG. 5, two associated projections engage in the recesses 50 of the actuating members 40, but do not engage in the recess 50' in the slide 60. In this position the pin 56 comes is at one end of the slot 54. As can be seen in FIGS. 5 and 2, the locking bar 52 cannot engage in the recess 50', since the recess 50' is located below the plane of movement of the locking bar 52. Rather the corresponding projection would come into contact with the unreduced circumference of the slide 60.

From this arrangement it follows that the locking bar 52 cannot reach a position in which the actuating members 40 are unlocked; as long as the interlock 44 is in its non-operating condition associated with the non-operating position of the carrier 46.

In an operating position (FIG. 4) the two projections that operate together are out of engagement with the recesses 50 of the actuating members 40, while the projection associated with the interlock 44 engages the recess 50' in the slide 60 and thereby prevents its movement. In this position, the pin 56 is adjacent the opposite end of the slot 54. When the slide 60 is blocked, the locking bar 52 can occupy its position blocking the actuating members 40 as well as its position freeing these.

The actuating arrangement 14 according to the invention operates as follows.

Starting with the illustration in FIG. 2, the non-operating condition of the actuating arrangement 14 and of the carrier 46 is shown.

In the position according to FIG. 2, the tensioning device 62 is in its bent position and the recess 50' of the slide 60 is drawn against the force of the spring 64 from the plane of movement of the locking bar 52. In this non-operating position, the slide 60 nevertheless projects with its entire circumference beyond the base plate of the housing 48 and, according to FIG. 5, thereby prevents any movement of the locking bar 52. Accordingly the projections remain engaged in the recesses 50 of the actuating members 40. Hence in this position the front end loader 12 cannot be operated.

When the carrier 46 occupies its operating position according to FIG. 3, the activation of the actuating members 40 is made possible. Since the tensioning device 62 then bridges the direct and shorter path between the slide 60 and the bearing location 68, the spring 64 moves the slide 60 so that the recess 50' reaches the plane of movement of the locking bar 52 and the locking bar 52 can be moved out of its position blocking the actuating members 40. Thereafter the locking bar 52 is completely free in its movement and the actuating members 40 can be activated by means of the shift lever 38. The locking bar 52 can also be selectively brought into its blocking position in order to avoid an operation of the front end loader 12 even if the carrier 46 is in its operating position.

Before the carrier 46 can again be pivoted into its non-operating position or into any other position, that is not its operating position, the locking bar 52 must first be brought into its position according to FIG. 5 in which the actuating members 40 are blocked.

It can be seen that the pivoting from the operating position into the non-operating position can be performed in order to open the passage 24. On the other hand, the operating position and the non-operating position can also be located behind the passage 24.

Figure 6:
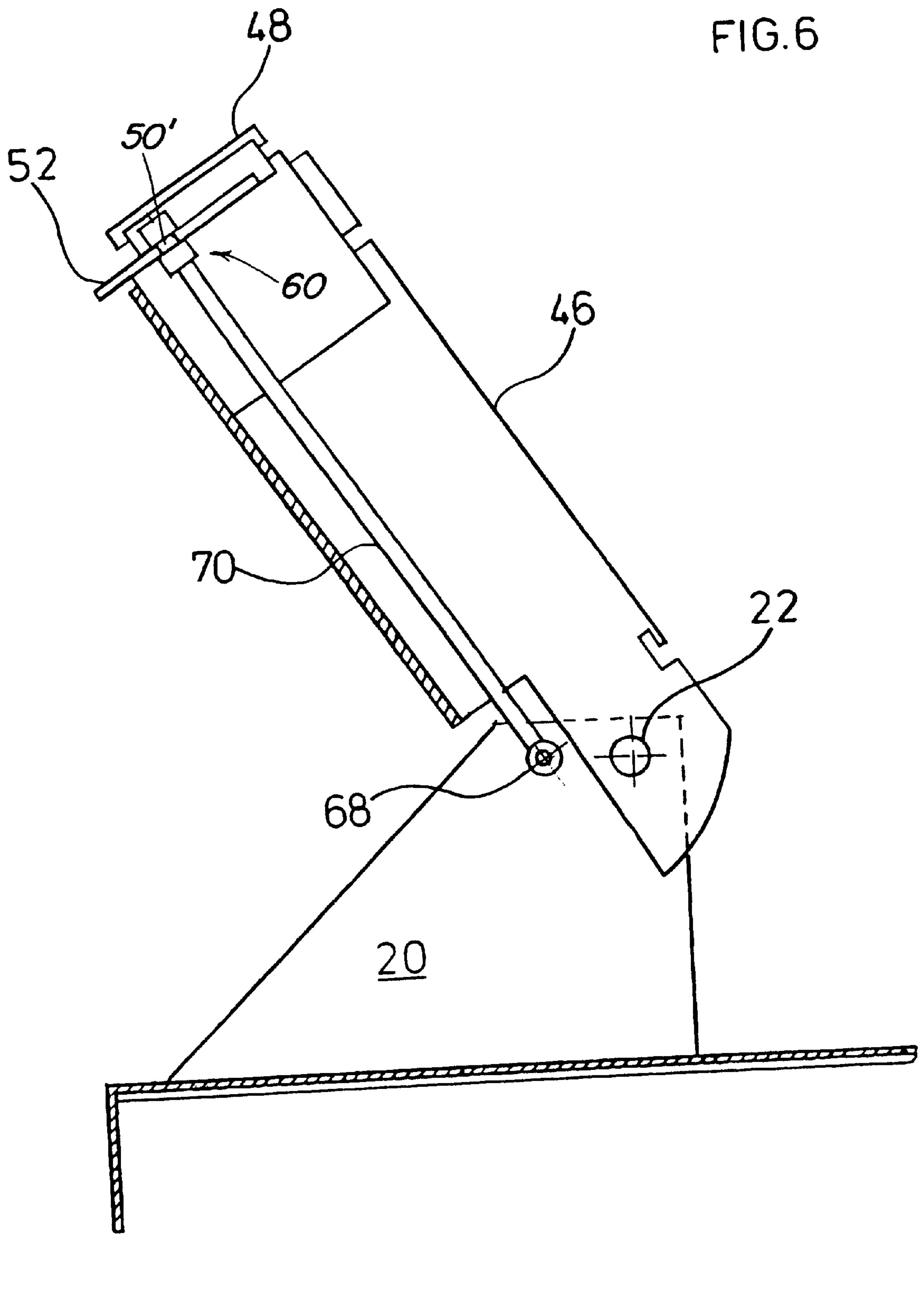
FIG. 6 shows another embodiment of the interlock.

FIG. 6 shows a slightly modified embodiment of the actuating arrangement 14. The essential differences consist of the fact that the interlock 44, the slide 60, the tensioning device 62, the spring 64 and the connecting devices 66 are incorporated into a rigid rod 70. Furthermore the bearing location 68 is provided on the other side with respect to the pivot axis 22.

The invention should not be limited to the above-described embodiment, but should be limited solely by the claims that follow.

What is claimed is:

1. An actuating arrangement (14) comprising at least one actuating member (40), one locking arrangement (42), a movable carrier (46) and an interlock (44) that can free the movement of the carrier (46), whose operation is a function of the position of the locking arrangement (42) wherein the actuating member (40) and the interlock (44) are supported in bearings so as to move longitudinally and that each is provided with a recess (50, 50') for engagement with the locking arrangement (42).

2. Actuating arrangement according to claim 1 wherein the locking arrangement (42) contains a mechanical locking bar (52), that can be brought selectively into positive locking with the actuating member (40) or the interlock (44).

3. Actuating arrangement according to claim 1 wherein the interlock (44) reacts to a change in position of the carrier (46) relative to a stationary bearing (20).

4. Actuating arrangement according to claim 1 wherein the interlock (44) is configured as a rod (70) that engages the stationary bearing (20) eccentric to a pivot axis (22) of the carrier (46).

* * * * *